(12) United States Patent
Priem (10) Patent No.: US 10,008,965 B2
(45) Date of Patent: Jun. 26, 2018

(54) GENSET REMOTE START CONTROL (71) Applicant: Cummins Power Generation IP, Inc., Minneapolis, MN (US)

(72) Inventor: Dan G. Priem, Brooklyn Center, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days. days.

(21) Appl. No.: 15/006,899

(22) Filed: Jan. 26, 2016

(65) Prior Publication Data
US 2017/0214349 A1    Jul. 27, 2017

(51) Int. Cl.
*H02P 9/08*    (2006.01)
*H02P 9/04*    (2006.01)

(52) U.S. Cl.
CPC . *H02P 9/08* (2013.01); *H02P 9/04* (2013.01)

(58) Field of Classification Search
CPC .................................... H02P 9/04; H02P 9/08
USPC ........................................................ 700/287
See application file for complete search history.

(56) References Cited

U.S. PATENT DOCUMENTS

| 743,331 | A | 11/1903 | Ries | |
|---|---|---|---|---|
| 6,074,246 | A | 6/2000 | Seefeldt et al. | |
| 6,181,028 | B1 * | 1/2001 | Kern | H02J 9/06 307/64 |
| 6,420,801 | B1 | 7/2002 | Seefeldt | |
| 7,230,345 | B2 | 6/2007 | Winnie et al. | |
| 8,369,068 | B2 | 2/2013 | Jonas et al. | |
| 8,483,982 | B2 | 7/2013 | Hancock et al. | |
| 2003/0053638 | A1 * | 3/2003 | Yasuhara | H04B 1/205 381/86 |
| 2004/0117077 | A1 * | 6/2004 | Kahle | H02J 4/00 701/21 |

(Continued)

FOREIGN PATENT DOCUMENTS

| CN | 102570744 | 7/2012 |
|---|---|---|
| CN | 202535220 U | 11/2012 |

(Continued)

OTHER PUBLICATIONS

Bernini Design, BE124 Generator Control Unit Manual, Jun. 10, 2015, V500. (33 pages).*

(Continued)

*Primary Examiner* — Mohammad Ali
*Assistant Examiner* — Joshua Sanders
(74) *Attorney, Agent, or Firm* — Foley & Lardner LLP (57) ABSTRACT

Systems and methods for controlling a generator set are disclosed herein. The method includes determining a state of local modes selectable via a local interface proximate to the generator set. The local modes include a local standby mode and a local remote enabled mode. The method also includes determining a state of a plurality of remote modes using a command from a device remote from the location of the generator set in response to determining the remote enabled mode is active. The method includes, in response to determining the local standby mode is active, the remote enabled mode is active, and one of the remote modes is active, determining whether to activate or stop the generator set based on the active remote mode and disabling the local standby mode from controlling activation of the generator set.

15 Claims, 8 Drawing Sheets (56) References Cited

U.S. PATENT DOCUMENTS

| | | | |
|---|---|---|---|
| 2004/0150374 A1* | 8/2004 | Kraus | H02J 9/066 |
| | | | 322/4 |
| 2004/0199297 A1* | 10/2004 | Schaper | H02J 3/00 |
| | | | 700/287 |
| 2005/0103195 A1 | 5/2005 | Golner | |
| 2005/0154499 A1* | 7/2005 | Aldridge | F02G 1/043 |
| | | | 700/286 |
| 2012/0046798 A1* | 2/2012 | Orthlieb | H02J 3/32 |
| | | | 700/297 |

FOREIGN PATENT DOCUMENTS

| | | |
|---|---|---|
| CN | 203386091 U | 1/2014 |
| GB | 1 416 741 | 12/1975 |
| GB | 2 450 758 | 1/2009 |
| JP | 2008-029092 | 2/2008 |

OTHER PUBLICATIONS

No Outage, Standby Generator System Remote Monitoring & Control, No-Outage.com, 2014, pp. 1-2, retrieved from http://www.nooutage.com/pdf/Web-GeneratorMonitoring.pdf Aug. 7, 2017.*
U.S. Appl. No. 15/006,846, filed Jan. 26, 2016, Priem, et al.
U.S. Appl. No. 15/006,791, filed Jan. 26, 2016, Priem, Dan G.

* cited by examiner

GENSET REMOTE START CONTROL

TECHNICAL FIELD

The present application relates generally to generator sets (gensets). More particularly, the present application relates to systems and methods for controlling a genset.

BACKGROUND

Generally, a genset that offers an "Auto Enabled" or "Standby" mode allows remote starting of the genset by a command from an automatic transfer switch (ATS). When a power outage occurs, the automated control system in the genset can command the genset to run. During an extended power outage, a user might want to stop the genset to save fuel or reduce noise when there is no or low need for genset backup power and to restart the genset when the backup power is again desired. In order to stop and/or restart the genset, a user may need to physically go to the location of the genset to manually stop and/or restart the genset, because these operations are not available from a remote location.

SUMMARY

One embodiment of the disclosure relates to a method for controlling a generator set. The method includes determining a state of a plurality of local modes selectable via a local interface proximate to the generator set, where the local modes include a remote enabled mode in which the generator set is enabled locally to activate or stop in response to receiving one or more commands from a device remote from a location of the generator set and a local standby mode in which the generator set activates or stops in response to detecting one or more conditions. The method also includes, in response to determining the remote enabled mode is active, determining a state of a plurality of remote modes using the one or more commands, the one or more commands generated based on input received via a user interface on the device. The remote modes include: a remote start mode in which the generator set is activated remotely, a remote stop mode in which the generator set is stopped remotely, and a remote standby mode in which the generator set is enabled remotely to activate or stop automatically in response to the one or more conditions being detected. The method further includes, the local standby mode is active, the remote enabled mode is active, and the remote start and remote stop modes are inactive, and each of the remote modes are inactive, determining whether to activate or stop the generator set in response to detecting the one or more conditions in accordance with the local standby mode. The method further includes, in response to determining the local standby mode is active, the remote enabled mode is active, and one of the remote start mode or remote stop mode is active, determining whether to activate or stop the generator set based on the active remote mode and disabling the local standby mode from controlling activation of the generator set.

Another embodiment of the disclosure relates to system for controlling a generator set. The system includes circuitry configured to determine a state of a plurality of local modes selectable via a local interface proximate to the generator set, where the local modes include a remote enabled mode in which the generator set is enabled locally to activate or stop in response to receiving one or more commands from a device remote from a location of the generator set and a local standby mode in which the generator set activates or stops in response to detecting one or more conditions. The circuitry is also configured to, in response to determining the remote enabled mode is active, determine a state of a plurality of remote modes using the one or more commands, the one or more commands generated based on input received via a user interface on the device. The remote modes include: a remote start mode in which the generator set is activated remotely, a remote stop mode in which the generator set is stopped remotely, and a remote standby mode in which the generator set is enabled remotely to activate or stop automatically in response to the one or more conditions being detected. The circuitry is further configured to, in response to determining the local standby mode is active, the remote enabled mode is active, and the remote start and remote stop modes are inactive, determine whether to activate or stop the generator set in response to detecting the one or more conditions in accordance with the local standby mode. The circuitry is further configured to, in response to determining the local standby mode is active, the remote enabled mode is active, and one of the remote start mode or remote stop mode is active, determine whether to activate or stop the generator set based on the active remote mode and disable the local standby mode from controlling activation of the generator set.

Still another embodiment of the disclosure relates to generator set including an engine, a generator operatively connected to the engine, a local interface, a communication interface structured to receive commands from a device remote from the generator set, and a controller communicably connected with the engine, the generator, the local interface, and the communication interface. The controller is configured to determine a state of a plurality of local modes selectable via the local interface. The local modes includes a local start mode in which the generator set is activated locally, a local stop mode in which the generator set is stopped locally, a local standby mode in which the generator set is enabled locally to activate or stop automatically in response to one or more conditions being detected, and a remote enabled mode in which the generator set is enabled locally to activate or stop in response to receiving one or more commands from a device remote from a location of the generator set. The controller is also configured to, in response to determining the remote enabled mode is active, determine a state of a plurality of remote modes using the one or more commands, the one or more commands generated based on input received via a user interface on the device. The remote modes include: a remote start mode in which the generator set is activated remotely, a remote stop mode in which the generator set is stopped remotely, and a remote standby mode in which the generator set is enabled remotely to activate or stop automatically in response to the one or more conditions being detected. The controller is further configured to, in response to determining the local standby mode is active, the remote enabled mode is active, and the remote start and remote stop modes are inactive, determine whether to activate or stop the generator set in response to detecting the one or more conditions in accordance with the local standby mode. The controller is further configured to, in response to determining the local standby mode is active, the remote enabled mode is active, and one of the remote start mode or remote stop mode is active, determine whether to activate or stop the generator set based on the active remote mode and disable the local standby mode from controlling activation of the generator set.

These and other features, together with the organization and manner of operation thereof, will become apparent from the following detailed description when taken in conjunction with the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A genset may be activated automatically by a command from an automatic transfer switch (ATS) under an "Auto Enabled" or "Standby" mode. For example, when the commercial electrical power from a utility fails, the genset may be automatically activated and a load may be switched from the utility power line to the genset responsive to receiving the ATS command. During an extended power outage, a user might want to stop the genset to conserve fuel or reduce noise when there is no or low need for genset backup power and to restart the genset when the backup power is again desired. The scheme disclosed herein, according to various exemplary embodiments, allows the user to remotely stop and restart the genset during the extended power outage. For the purposes of the present disclosure, a command may be any type of data upon which action may be taken by the genset. In various embodiments, the command may provide express instructions for the genset to take a particular action or may provide information that can be used by the genset to determine an action to take (e.g., based on by comparing the information to one or more rules determining actions to be taken, such as switching modes).

Referring to the figures generally, various embodiments disclosed herein relate to systems and methods for controlling a genset with a local interface (e.g., a local human machine interface) proximate to the genset and a remote interface (e.g., a remote human machine interface) on a device remote from the genset. As used herein, "proximate to the genset" means that the interface is part of the genset, coupled to the genset, adjacent to the genset, within a predetermined distance of the genset, etc. As used herein, "remote from the genset" means that the device is not proximate to the genset (e.g., not coupled to or adjacent to the genset, outside a predetermined distance of the genset, etc.). For example, a remote device may be located in a residence or other building to which the genset is connected or may be a phone or other mobile device. The local interface provides local "Start," "Stop," "Standby," and "Remote" options for selection. In some implementations, the local "Standby" can only be enabled if the "Remote" is enabled. In other words, if the "Remote" is enabled, the "Standby" can be either enabled or disabled. If the "Remote" is disabled, the "Standby" can only be disabled. This configuration allows a local technician to disable all means of remote start commands by disabling the "Remote" option. If the "Remote" is enabled and the "Standby" mode is disabled via the local interface, the genset is configured to activate or stop in response to receiving a command from the device remote from the genset. The command is generated based on a user selection of a remote mode from among a plurality of remote modes on the remote interface. The remote modes may include remote "Start," "Stop," and "Standby" modes. In other words, if one of the local "Start" and "Stop" options is selected via the local interface, the genset will be activated or stopped based on the local mode being selected. If the local "Remote" is enabled and the local "Standby" is enabled, the genset is in the "Standby Enabled" mode, and will be activated or stopped based on the conditions being monitored by, for example, some intelligent devices. If the local "Remote" is enabled and the local "Standby" is disabled, the genset is in the "Remote Enabled" mode, and will be activated or stopped based on the remote mode being selected from the remote interface. Thus, the user can start and stop the genset from a remote device such as a display or switch inside the home or via a web or cellular connection without being physically present at the genset. Meanwhile, any concern with automatic starting can be addressed by the availability of disabling all remote starts through the local interface.

Figure 1:
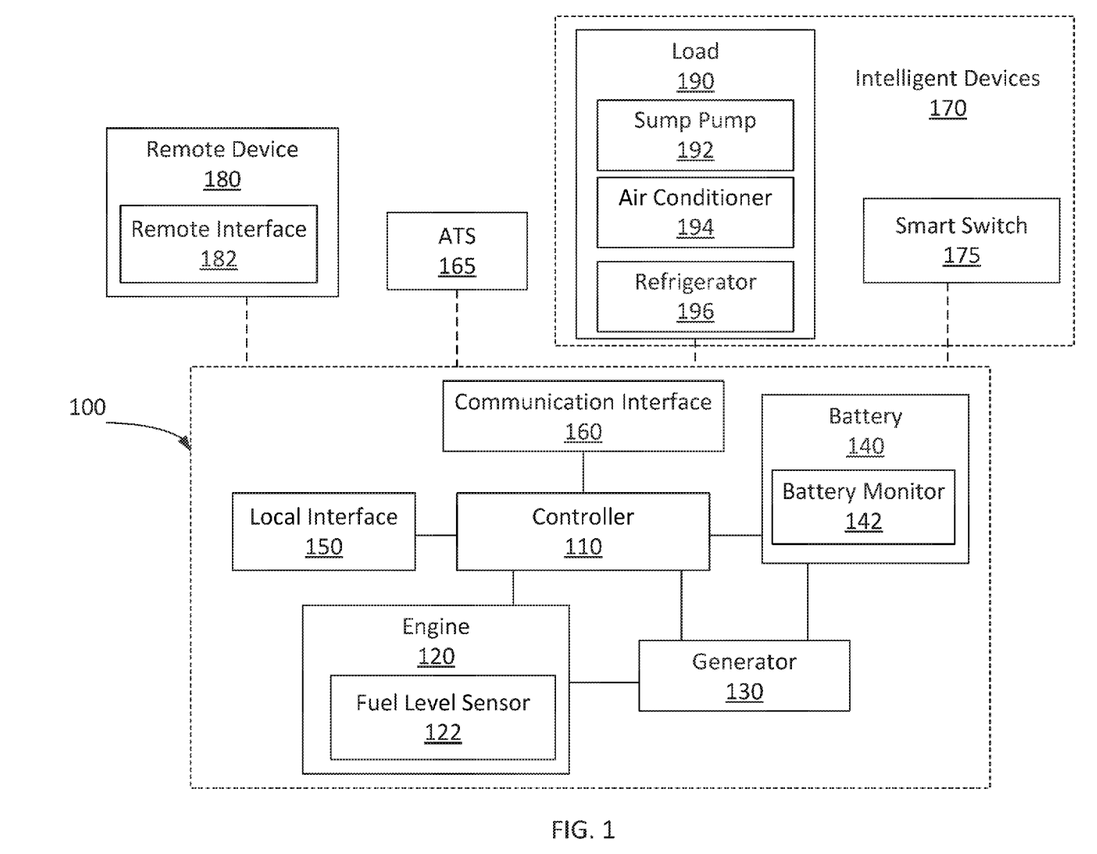
FIG. 1 is a schematic diagram of a system for controlling a generator set.

Referring to FIG. 1, a schematic diagram of a system for controlling a generator set (genset) 100 is shown according to an exemplary embodiment. The genset 100 may include an engine 120 that provides mechanical energy to drive a generator 130 to produce electrical power. The engine 120 may be a gas turbine engine, a gasoline engine, a diesel engine, or any other engine capable of supplying mechanical power to drive the generator 130. The engine 120 may include a fuel level sensor 122 that monitors the level of the gas, gasoline, or diesel remaining. The fuel level sensor 122 may be capacitance type, magneto resistance type, ultrasound type, or any other suitable type. The fuel level sensor 122 may be structured to generate commands indicative of the remaining fuel level for the use of a controller 110 in controlling operations of the genset 100.

The genset 100 may include a battery 140 electrically coupled to the generator 130. In some embodiments, the battery 140 includes a rechargeable battery that supplies a voltage at 12 VDC. The battery 140 may be charged by the generator 130 when the genset 100 is in operation. The battery 140 may include a battery monitor 142 that monitors the condition (e.g., state of charge) of the battery 140. The battery monitor 142 may be structured to generate commands indicative of the condition of the battery 140 for the use of the controller 110.

Figure 2:
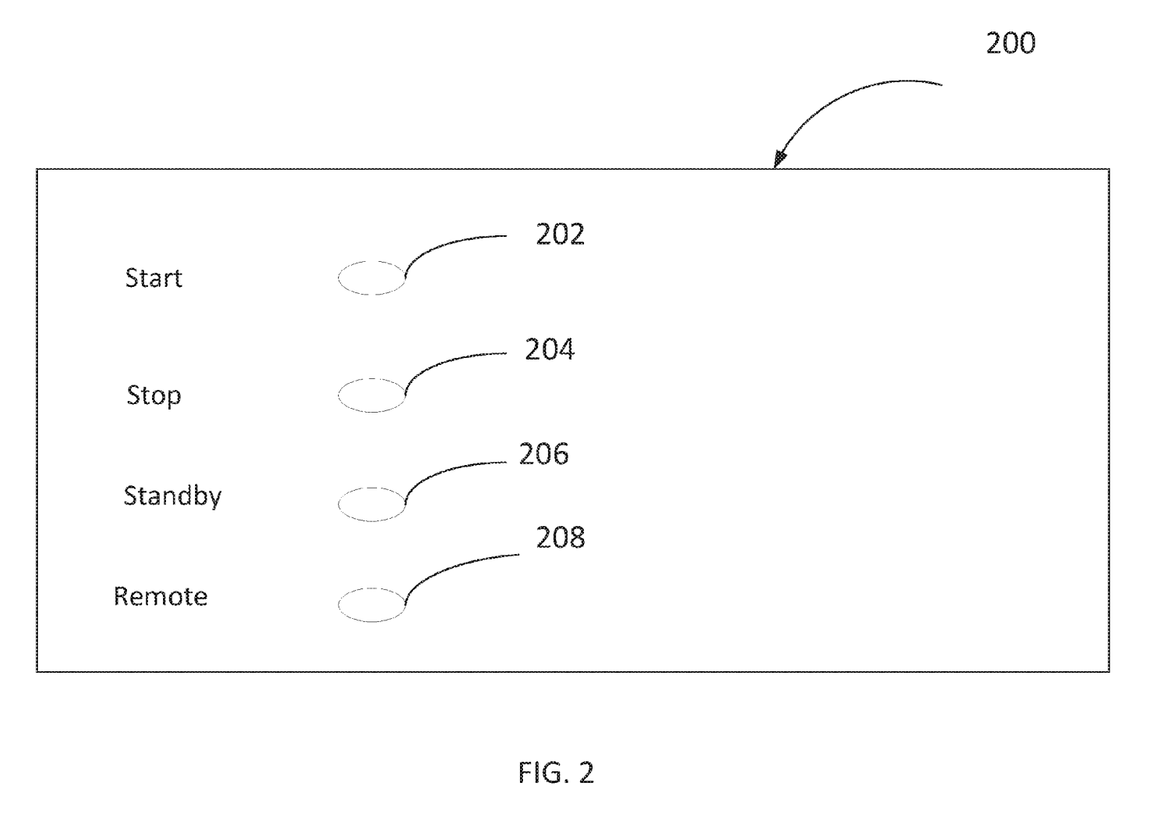
FIG. 2 is a schematic diagram of a portion of a local interface of FIG. 1.

The genset 100 may include a local interface 150 that serves as a local user interface of the genset 100. The local interface 150 may be configured to convey information to a user on a display and to receive a user input via, for example, a keypad, switches, and/or buttons. FIG. 2 shows a schematic diagram of a portion of a local interface 200 that may be used on the genset 100 of FIG. 1. The local interface 200 may include, among other components, button 202 corresponding to a "Start" option, button 204 corresponding to a "Stop" option, button 206 corresponding to a "Standby" option, and button 208 corresponding to a "Remote" option. When a user presses the button 202, the genset 100 is in a "Start" mode and activated. When the button 204 is pressed, the genset 100 is in a "Stop" mode and stopped. In some implementations, the button 206 can only be pressed when the button 208 has been pressed. If the button 208 has not been pressed, the button 206 cannot be pressed. If the buttons 206 and 208 are both pressed, the genset is in a "Standby Enabled" mode and enabled to activate or stop automatically in response to one or more conditions being detected. If the button 206 is not pressed while the button 208 is pressed, the genset 100 is in a "Remote Enabled" mode and enabled to activate or stop in response to receiving a command from a device 180 remote from a location of the genset 100. This configuration allows a local technician to disable all means of remote start commands by disabling the "Remote" option. The "Standby Enabled" mode and the "Remote Enabled" mode will be discussed in detail below. It shall be appreciated that the configuration of the local interface 200 shown in FIG. 2 is provided for purposes of illustration only. Other embodiments may include fewer, more, or different components than those illustrated in FIG. 2. For example, the local interface 200 may display genset fault messages, time, temperature, humidity, warning, mode, and other information to a user. Different manufacturers may have varied features to offer in the local interface 200. Additionally, while interface elements are described as buttons, it should be understood that any type of interface elements could be used in various implementations, including, but not limited to, touch-screen display devices, switches, keypads, etc.

Now referring back to FIG. 1, when the "Standby Enabled" mode is selected by a user via the local interface 150 (e.g., both buttons 208 and 206 are pressed), the genset 100 may automatically activate or stop in response to one or more conditions being detected, such as, but not limited to, a fuel level monitored by the fuel level sensor 122, a battery condition monitored by a battery monitor 142, a power outage monitored by an automatic transfer switch (ATS) 165 or the controller 110, and remote conditions monitored by intelligent devices 170. In some embodiments, the "Standby Enabled" mode may control operation of the genset 100 in response to detection of conditions in absence of conflicting commands from a user via a remote device 180. For example, as discussed in further detail below, if the remote device 180 provides commands indicating the genset 100 should stop, the genset 100 may deactivate and the "Standby Enabled" mode may be disabled from activating the genset 100 even if the conditions for activating the genset 100 are detected. Similarly, if the remote device 180 provides commands indicating the genset 100 should start, the genset 100 may activate and the "Standby Enabled" mode may be disabled from deactivating the genset 100 even if the conditions for deactivating the genset 100 are detected. If the remote device 180 provides commands remotely indicating that the genset 100 should be controlled according to the standby operation, or if no remote modes are enabled, the activation and deactivation of genset 100 may be controlled according to the detection of the conditions in accordance with the "Standby Enabled" mode.

The remote conditions may include a demand input from a load 190, a level of grid use monitored by a smart switch 175, etc. In some embodiments, when the "Standby Enabled" mode is selected via the local interface 150, the genset 100 may automatically stop in response to the fuel level sensor 122 detecting that the level of the remaining fuel is below a predetermined fuel level during an extended power outage. In some embodiments, the genset 100 may automatically start to charge the battery 140 in response to the battery monitor 142 detecting that the battery condition (e.g., state of charge) is below a predetermined condition. In some embodiments, the genset 100 may automatically activate in response to the ATS 165 or the controller 110 detecting that the utility power fails, and automatically stop in response to the ATS 165 or the controller 110 detecting that the utility power is back. The ATS 165 may be an open transition ATS, a close transition ATS, a delayed transition ATS, or any suitable type of ATS. The ATS 165 may be structured to generate commands indicative of the power outage and transmit the commands to the controller 110 via a communication interface 160.

The intelligent devices 170 may include the load 190 and the smart switch 175. In some embodiments, when the "Standby Enabled" mode is selected via the local interface 150, the genset 100 may automatically activate in response to the load 190 signaling a demand input. The load 190 may include appliances such as a sump pump 192, an air conditioner 194, and a refrigerator 196. In some embodiments, when a sump sensor (not illustrated in the present figure) coupled the sump pump 192 detects a water level higher than a predetermined value, the sump pump 192 may indicate a demand input to activate the genset 100 to generate power for running the sump pump 192. In some embodiments, when a thermometer/thermostat (not illustrated in the present figure) coupled to the air conditioner 194 or the refrigerator 196 detects a temperature outside a predetermined range, the air conditioner 194 or the refrigerator 196 may indicate a demand input to activate the genset 100 to generate power for running the air conditioner 194 or the refrigerator 196. The load 190 may be structured to transmit the demand input to the controller 110 via a communication interface 160. In some embodiments, the demand input may be received from a "dumb" load without a sensor, such as a conventional air conditioning unit, refrigerator, sump pump, etc. without a sensor or controller enabling smart/advanced functionality. For example, such loads may have no knowledge of upcoming demand and cannot signal the genset 100 that demand is coming and may merely run as needed.

In some embodiments, when the "Standby Enabled" mode is selected via the local interface 150, the genset 100 may automatically activate or stop in response to a level of grid use monitored by the smart switch 175. As used herein, the "smart switch" is an automated switch capable of changing the flow of electricity in response to detected conditions, such as conditions of a distribution grid of the utility. The smart switch 175 may be an automated load-break switch, capacitor switch, conventional recloser, pulse closer, or any suitable type of switches. In some embodiments, the smart switch 175 can monitor the grid use, generate commands indicative of the grid use, and transmit the commands to the controller 110 via the communication interface 160. The genset 100 may automatically activate in response to the smart switch 175 detecting that the grid use is higher than a predetermined level of grid use. Then the smart switch 175 may disconnect the load 190 from the utility power line and connect the load 190 to the backup power provided by the genset 100. In some embodiments, the smart switch 175 can charge the battery 140 and direct the battery 140 to provide power to the load 190 based on utility demand. For example, the smart switch 175 can charge the battery 140 during times of low demand (e.g., during an off-peak time, such as overnight, when utility rates are lower) and use power saved in the battery 140 to power the load 190 during times of high demand (e.g., during a peak time when utility rates are higher). Using such functionality, the smart switch 175 may reduce a cost of powering the load 190 while also lowering demand on the utility during peak demand times.

When the "Remote Enabled" mode is selected via the local interface 150 (e.g., the button 208 is pressed while the button 206 is not pressed), the genset 100 is enabled to activate or stop in response to receiving a command from the remote device 180. The remote device 180 may be, for example, a computer device in a residence or other building or structure to which the genset 100 is connected, or a mobile phone or other mobile device at least a predetermined distance from the genset 100, or a remote mounted human machine interface (HMI). The remote device 180 may include a remote interface 182 configured to convey information to a user on a display and to receive a user input via, for example, a keypad, a touch screen, switches, and/or buttons. In some embodiments, there may be more than one remote device 180. The command used to activate or stop the genset 100 may be generated based on the user input via the remote interface 182 and transmitted to the controller 110 via the communication interface 160, when the "Remote Enabled" mode is selected via the local interface 150. In some embodiments, an active remote mode may override the functionality of the "Standby Enabled" mode. That is, if a command is received from the device 100 indicating that the genset 100 should be activated or stopped, that command may control operation of the genset 100, and the "Standby Enabled" mode functionality may be disabled from starting and stopping the genset in favor of the command from the device 180. For example, if the remote device 180 provides commands indicating the genset 100 should stop, the genset 100 may deactivate and the "Standby Enabled" mode may be disabled from activating the genset 100 even if the conditions for activating the genset 100 are detected. If the remote device 180 provides commands indicating the genset 100 should start, the genset 100 may activate and the "Standby Enabled" mode may be disabled from deactivating the genset 100 even if the conditions for deactivating the genset 100 are detected. If the remote device 180 provides commands remotely indicating that the genset 100 should be controlled according to the standby operation, or if no remote modes are enabled, the activation and deactivation of genset 100 may be controlled according to the detection of the conditions in accordance with the "Standby Enabled" mode.

Figure 3:
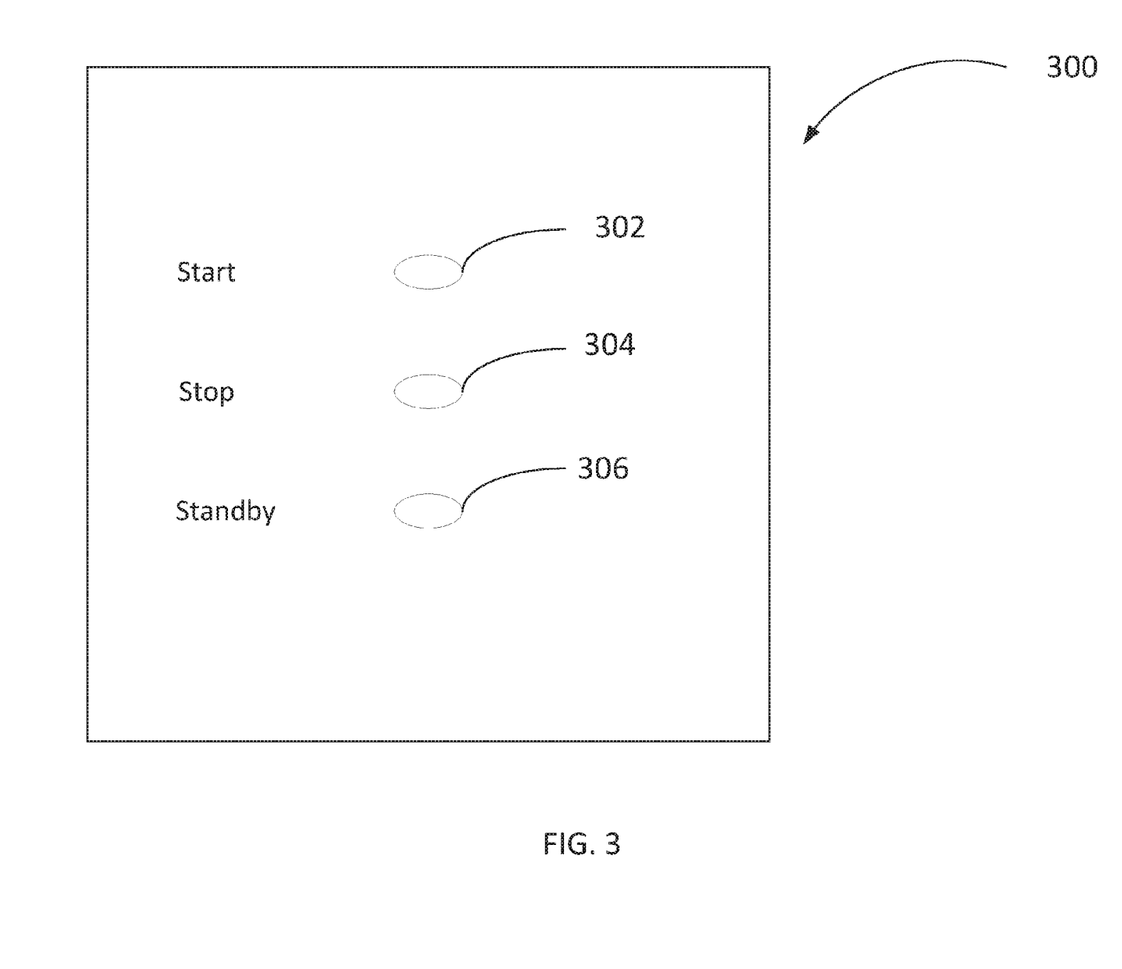
FIG. 3 is a schematic diagram of a portion of a remote interface of FIG. 1.

FIG. 3 shows a schematic diagram of a portion of a remote interface 300 that may be used on remote device 180 of FIG. 1. The remote interface 300 may include, among other components, button 302 corresponding to a remote "Start" mode, button 304 corresponding to a remote "Stop" mode, button 306 corresponding to a remote "Standby Enabled" mode. When a user presses the button 302, the "Start" mode is selected and the genset 100 is activated remotely. When the button 304 is pressed, the "Stop" mode is selected and the genset 100 is stopped remotely. In some embodiments, when the remote "Start" or "Stop" modes are selected and active, the operation of the genset 100 is controlled according to the active remote mode, and the local "Standby Enabled" mode is disabled from activating and/or stopping the genset 100. For example, the remote "Stop" mode may allow a user to command the genset 100 to stop even if utility power has been lost and the "Standby Enabled" mode would otherwise cause the genset 100 to activate in response to the loss of utility power.

When the button 306 is pressed, the "Standby Enabled" mode is selected and the genset 100 is enabled to activate or stop automatically in response to one or more conditions being detected. The operations under the remote "Standby Enabled" mode are similar to those under the local "Standby Enabled" mode selective via the local interface 150. Specifically, when the "Remote Enabled" mode is selected via the local interface 150 and the "Standby Enabled" mode selected via the remote interface 182, the genset 100 may automatically activate or stop in response to one or more conditions being detected, such as, but not limited to, the fuel level monitored by the fuel level sensor 122, the battery condition monitored by the battery monitor 142, the power outage monitored by an automatic transfer switch (ATS) 165 or the controller 110, and remote conditions monitored by the intelligent devices 170. The remote conditions may include the demand input from the load 190, the level of grid use monitored by the smart switch 175, etc. as discussed above. In some embodiments, selection of the remote "Standby Enabled" mode causes the genset 100 to be controlled according to the local "Standby Enabled" mode.

Referring back to FIG. 1, the genset 100 may further include the controller 110 that controls operations (e.g., activating and stopping) of the genset 100 and the communication interface 160 via which the controller 110 receives commands from external devices, such as the remote device 180, the ATS 165, the load 190, and the smart switch 175. The controller 110 may be communicably coupled with the engine 120, the generator 130, the battery 140, the local interface 150, and the communication interface 160. The controller 110 may receive and respond to commands generated from the fuel level sensor 122 indicative of the fuel level, commands generated from the battery monitor 142 indicative of the battery condition, commands generated from the ATS 165 indicative of the power outage, commands generated from the load 190 indicative of the demand input, commands generated from the smart switch 175 indicative of the grid use level, and commands generated from the remote interface 182 based on the user selection of a remote mode.

In some embodiments, the controller 110 may be implemented as a combination of a processor and a memory (not illustrated in the present figure). The processor may be implemented as a general-purpose processor, an application specific integrated circuit (ASIC), one or more field programmable gate arrays (FPGAs), a digital signal processor (DSP), a group of processing components, or other suitable electronic processing components. The memory may be one or more memory devices (e.g., RAM, ROM, flash memory, hard disk storage, etc.) that stores data and/or computer code for facilitating the various processes described herein. The memory may be communicably connected to the processor and provide computer code or instructions to the processor for executing the processes described in regard to the controller 110 herein. Moreover, the memory may be or include tangible, non-transient volatile memory or nonvolatile memory. Accordingly, the memory may include database components, object code components, script components, or any other type of information structure for supporting the various activities and information structures described herein. In some embodiments, the controller 110 may be implemented as dedicated hardware such as circuitry.

Communication between the controller 110 and various components of the genset 100 and various external devices may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of commands, information, and/or data. The CAN bus may include any number of wired and wireless connections. The communication interface 160 may be implemented as a wired input/output (I/O) interface and/or a wireless I/O interface.

It shall also be appreciated that the configuration of the generator 110 shown in FIG. 1 is provided for purposes of illustration only. Other embodiments may include fewer, more, or different components than those illustrated in FIG. 1.

Figure 4:
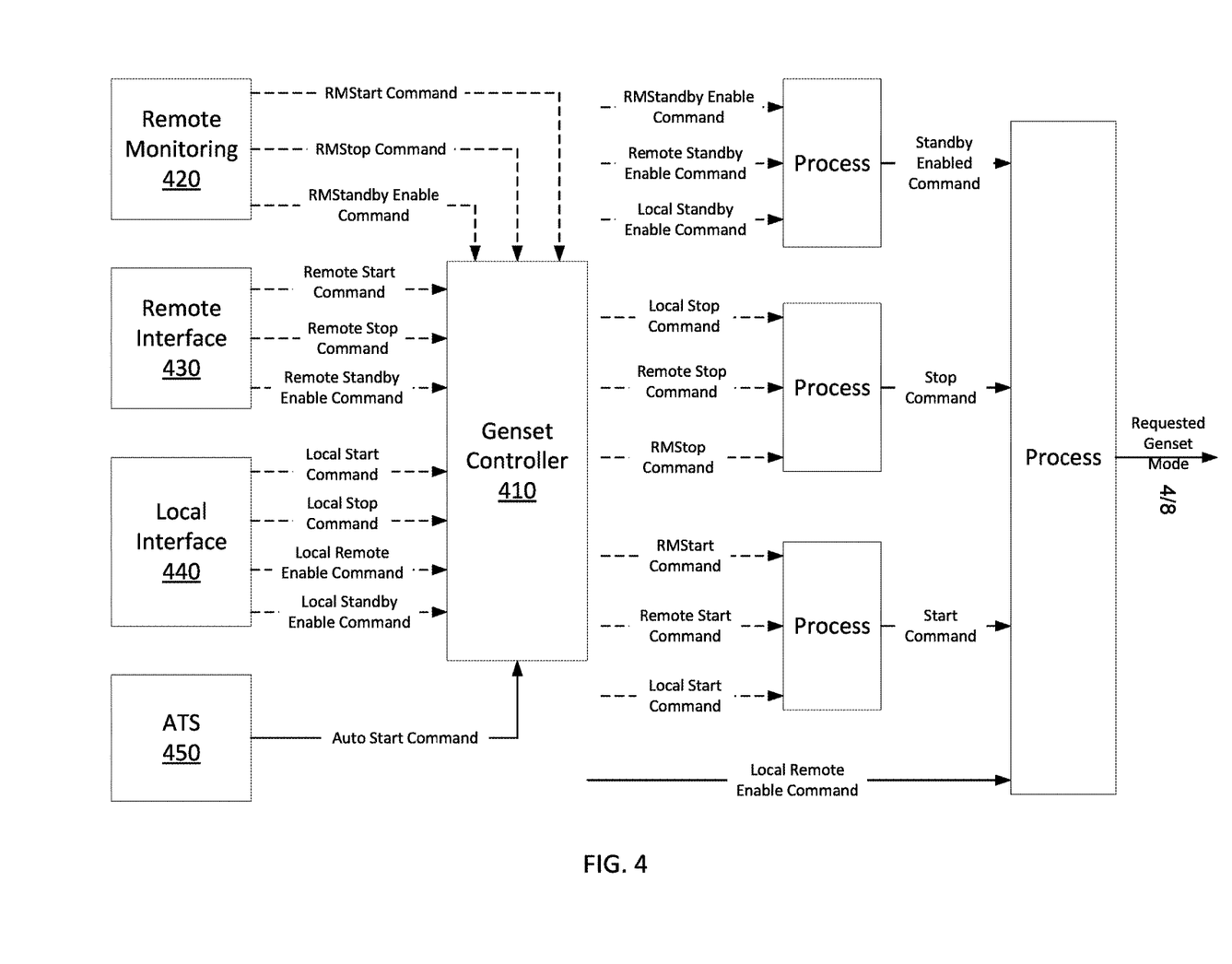
FIG. 4 is a schematic diagram showing an example of interactions between a controller and a local interface as well as a remote interface.

Referring now to FIG. 4, a schematic diagram illustrating an example of interactions between a controller and a local interface as well as a remote interface is shown. As discussed above, in some implementations, four commands may be implemented on the genset 100.

1. Start Command—The Start command is used to start the genset. It is available on both the local and remote interfaces. In some implementations, the Remote Enabled command must be active in order to start the genset from the remote interface.

2. Stop Command—The Stop command is used to stop the genset. Stop can be commanded from either the remote or the local interface.

3. Standby Enable Command—The Standby Enable command allows the genset to automatically activate/deactivate based on detected conditions, such as commands by the ATS and/or the intelligent device. It is available on both the local and remote interface. It can be activated only if the Remote Enable Command is activated locally first.

4. Remote Enable Command—The Remote Enabled command allows the user to control the genset from the remote interface. It is available on local interface only. This allows an individual working locally on the genset to disable all remote start commands (automatic and manual).

In the design illustrated in FIG. 4, all the different start/stop commands originating from various devices such as the remote monitoring system 420, the remote interface 430, the local interface 440, and the ATS 450 are fed into the controller 410. As used herein, the "remote monitoring system" refers to devices that have manual start/stop capability similar to a remote display. The controller 410 then processes these commands and, based on the commands, determines a mode in which to place the genset (e.g., Run, Stop, or Remote Enabled/Standby). In the design of FIG. 4, all start/stop commands are routed to the controller 410 and the responsibility of determining the mode is put on the controller 410. For example, the controller 410 receives Start, Stop, and Standby Enabled commands from each of the remote monitoring system 420, the remote interface 430, the local interface 440, and the ATS 450, as well as a local Remote Enabled command from the local interface 440, and arbitrates between the commands to determine what mode should be selected. In some implementations: (1) if the local Start command from local interface 440 is active, the controller 410 starts the genset; (2) if the local Stop command from local interface 440 is active, the controller stops the genset; (3) if the local Remote Enabled command from the local interface 440 is active and the local Standby Enabled command is inactive, the controller 410 determines the mode based on the command from the remote interface 430; (4) if the local Remote Enabled command is active and the Standby Enable command (either local or remote) is active, the controller 410 determines control based on any active remote modes and/or one or more monitored conditions. For example, the controller 410 may determine if a remote Start or Stop command has been received from the remote interface 430. If so, the controller 410 may control operation of the genset based on the active remote mode, regardless of whether the local Standby Enabled mode would activate the genset. If the remote Start and Stop commands are not active, or if a remote Standby Enable command has been received, the controller 410 enters the Standby Enabled mode and determines whether to activate/deactivate based on monitored conditions, such as in response to the commands from the ATS 450 and/or any intelligent devices requesting a genset start/stop. In some implementations, the controller 410 may determine which of the ATS 450 or the remote monitoring system 420 control the mode in the event of a conflict (e.g., if the ATS 450 issues a start command and the remote monitoring system 420 issues a stop command, the controller 410 may choose to follow one and ignore the other). In this illustrated implementation, the controller 410 receives all the commands and may arbitrate conflicts based on predetermined rules. In some embodiments, when the Standby Enabled command is active and controlling, if any of the ATS 450 and the intelligent devices requests the genset to start, the controller 410 would start the genset.

Figure 5:
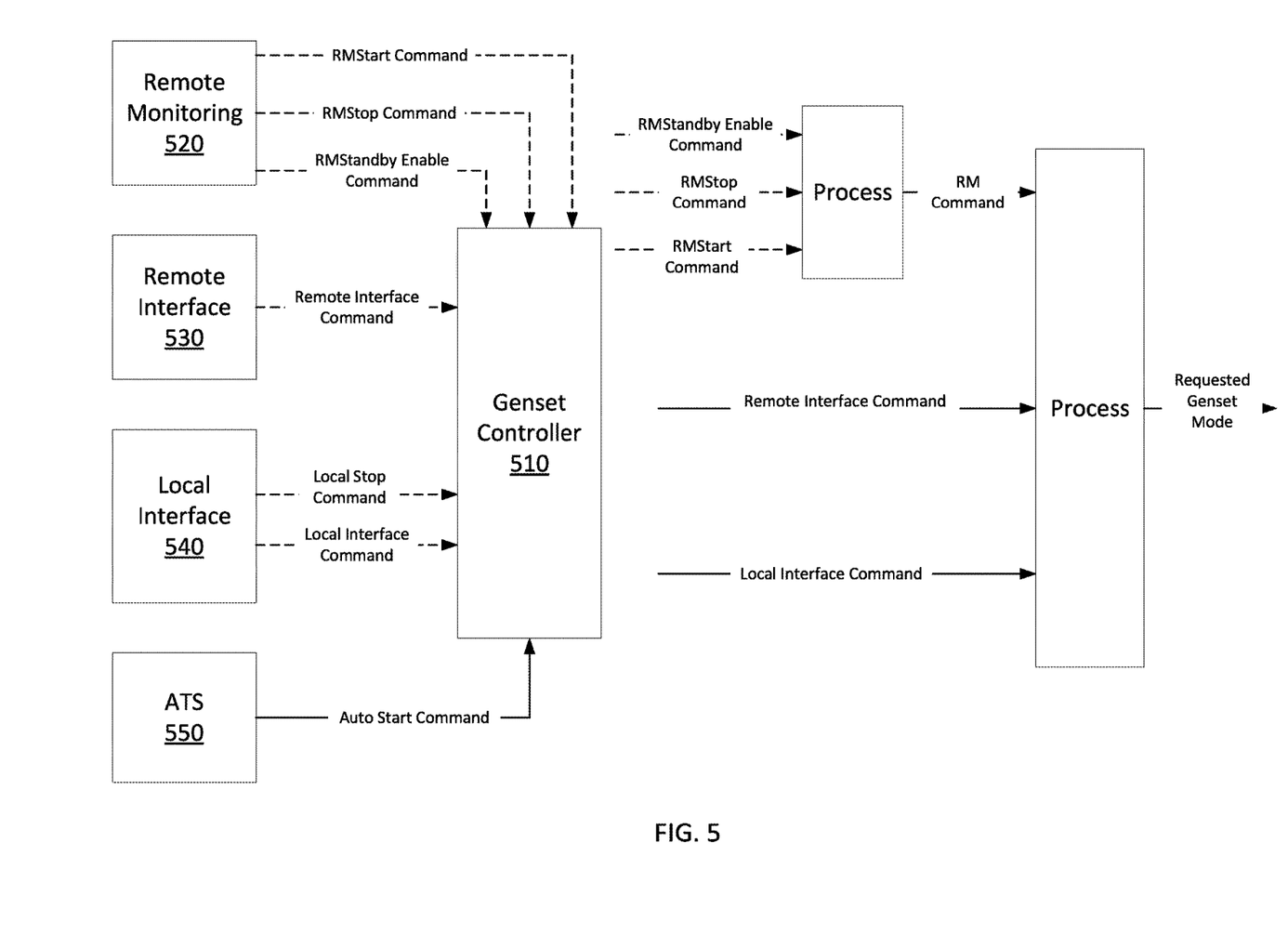
FIG. 5 is a schematic diagram showing another example of interactions between a controller and a local interface as well as a remote interface.

Referring now to FIG. 5, a schematic diagram illustrating another example control design is shown. Various modes (e.g., Start, Stop, Standby Enabled, and Remote Enabled) are mutually exclusive, and the controller can only be in one of these modes at a time. Even if different interfaces (e.g., the local interface and the remote interface) are sending contradicting mode information to the controller, one interface can still set only one mode at a time. In other words, one interface can at a time command the controller to be in one of Start, Stop, Standby Enabled or Remote Enabled modes. Considering the above, an interface may not need to send all the start/stop commands to the controller. The interface may determine the current mode being selected by the user and let the controller know that mode. The controller 510 may receive the current mode requested from different sources, such as the remote interface 530, the local interface 540, the ATS 550, and the remote monitoring system 520, and conclude the controller mode via predetermined rules, as described above.

Figure 6:
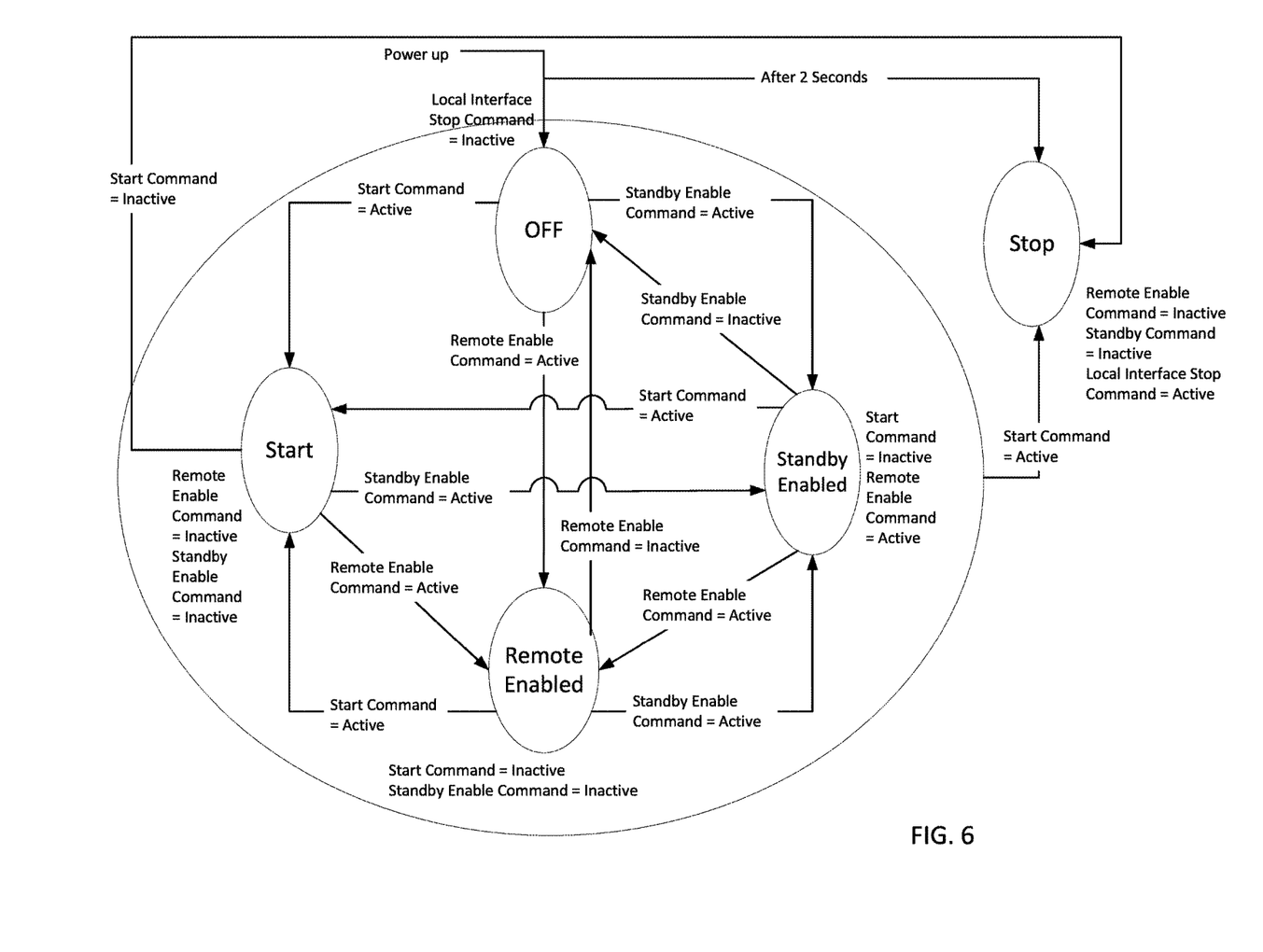
FIG. 6 is a schematic diagram showing transitions between a plurality of local modes on a local interface for the design of FIG. 5.

FIG. 6 is a schematic diagram showing transitions between a plurality of local modes on a local interface for the design of FIG. 5, according to some implementations. As discussed above, the local interface may be used to select from among four modes, as shown Table 1. An additional "Off" mode is shown in that table as well, as described below. The local interface may have an additional hardwired interface for a local Stop command, which may be used to stop the genset if the network communication failure occurs.

TABLE 1

Commands and corresponding modes from the local interface

| Commands | Modes |
|---|---|
| Start Command | Start |
| Stop Command | Stop |
| Remote Enable Command | Remote Enabled |
| Standby Enable Command | Standby Enabled |
| | Off |

According to the logic illustrated in FIG. 6, the Start command can be made active/inactive from the mode button screen as shown in FIG. 2. Making the Start command inactive is same as the Stop command being Active, in some embodiments. Turning the Standby Enabled mode Active from the mode button screen shall turn both Remote Enable command and Standby command Active. Turning the Remote Enabled mode Active/Inactive from the mode button screen will cause the Remote Enable command to become Active/Inactive. In some implementations, the Stop command can only be made Active, and it will automatically become Inactive after about, for example, 2 seconds when the Stop command is communicated to the controller. The Stop command can be activated using the dedicated Stop button on the local interface. Off mode is lack of any other mode/command discussed above. In some embodiments, the local interface command may be communicated to the controller every time the value changes.

Figure 7:
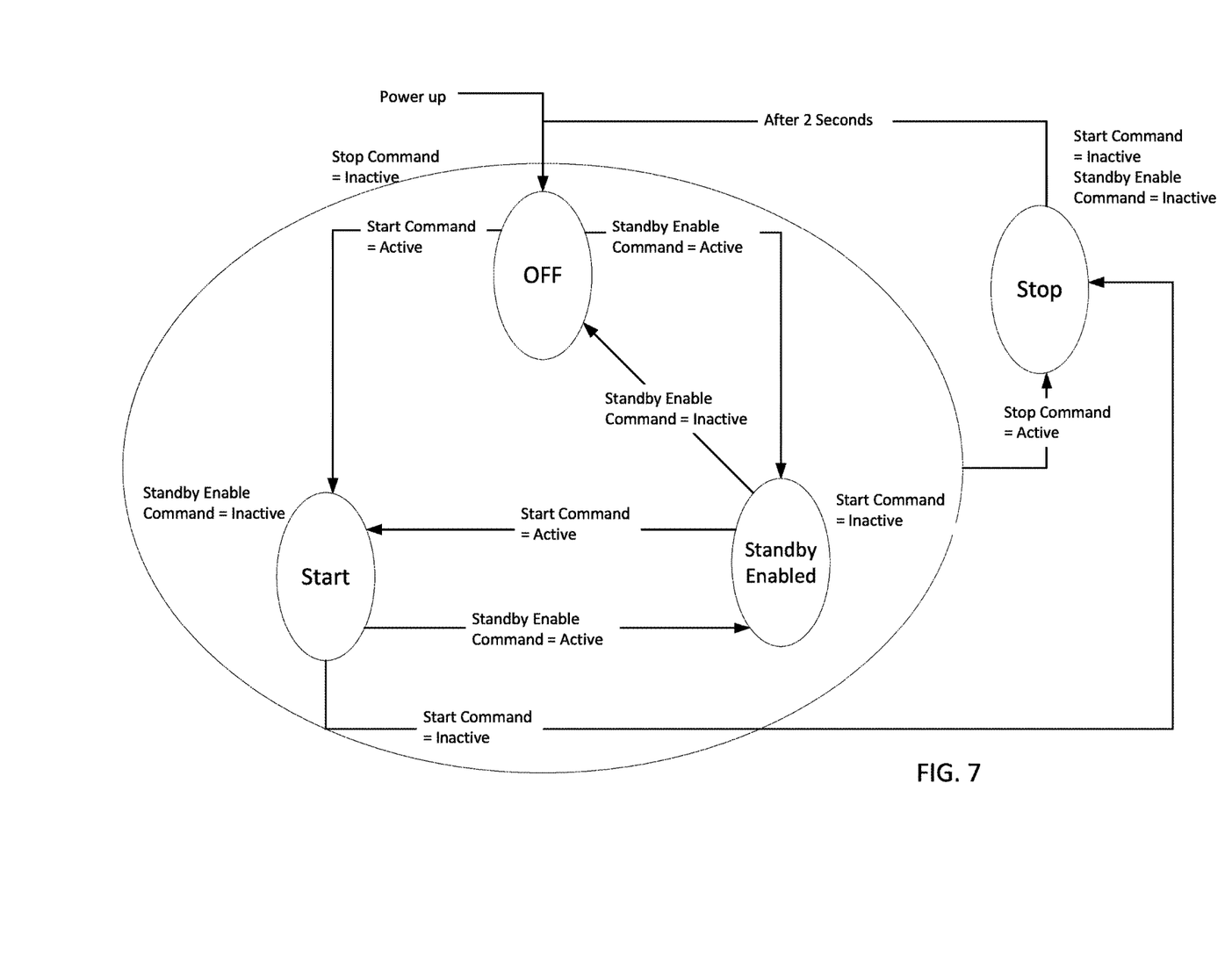
FIG. 7 is a schematic diagram showing transitions between a plurality of remote modes on a remote interface for the design of FIG. 5.

FIG. 7 is a schematic diagram showing transitions between a plurality of remote modes on a remote interface for the design of FIG. 5, in some implementations. The remote interface may have all the same commands except Remote Enable command. In some implementations, with the Remote Enable command missing, the remote interface cannot request the controller to be in Remote Enabled mode. However, when the controller is already in Remote Enabled mode (from the local interface), the remote interface may be used to either operate (Start/Stop) the genset or put the genset in Standby Enabled Mode. Table 2 shows the commands and corresponding modes from the remote interface. It should be noted that the Standby Enabled mode can only be activated if Remote Enable command is active from local interface. It should also be noted that after a mode is selected either from the local interface or the remote interface, transitions between the modes can happen. For example, when the genset is in the Standby Enabled mode, a detection of utility failure from the ATS will activate the Start Command and transit the genset from the Standby Enabled mode to the Start mode. When the genset is in the Remote Enabled mode, a press of Start button on the remote interface will activate the Start Command and transit the genset from the Remote Enabled mode to the Start mode; if the Stop button is then pressed on the remote interface, the Stop command will be activated and the genset will be transited from the Start mode to the Stop mode.

TABLE 2

Commands and corresponding modes from the remote interface

| Commands | Modes |
|---|---|
| Start Command | Start |
| Stop Command | Stop |
| Standby Enable Command | Standby Enabled |
| | Off |

The Remote Enable command can be communicated to the controller every time the value changes, in some implementations.

Table 3 shows the logic for determining remote command at the controller end from the commands generated from remote monitoring device, in some implementations.

TABLE 3

Logic of determining remote command

| Input | | | |
|---|---|---|---|
| RM Stop Command | RM Start Command | RM Standby Enable Command | Output RM Command |
| Inactive | Inactive | Inactive | Off |
| Active | X | X | Stop |
| Inactive | Active | X | Start |
| Inactive | X | Active | Auto Ready |

On the controller side, Standby Enabled mode may be determined to drive the appropriate genset function using the logic defined below, in some implementations. First, the controller may check for Stop as it is highest priority, if active take appropriate action. Second, the controller may check for the Start command, and if active, start the genset. Third, the controller may check for Standby Enable Status, and if active, then put the genset on standby and wait for an ATS Auto Start command to start the genset.

Figure 8:
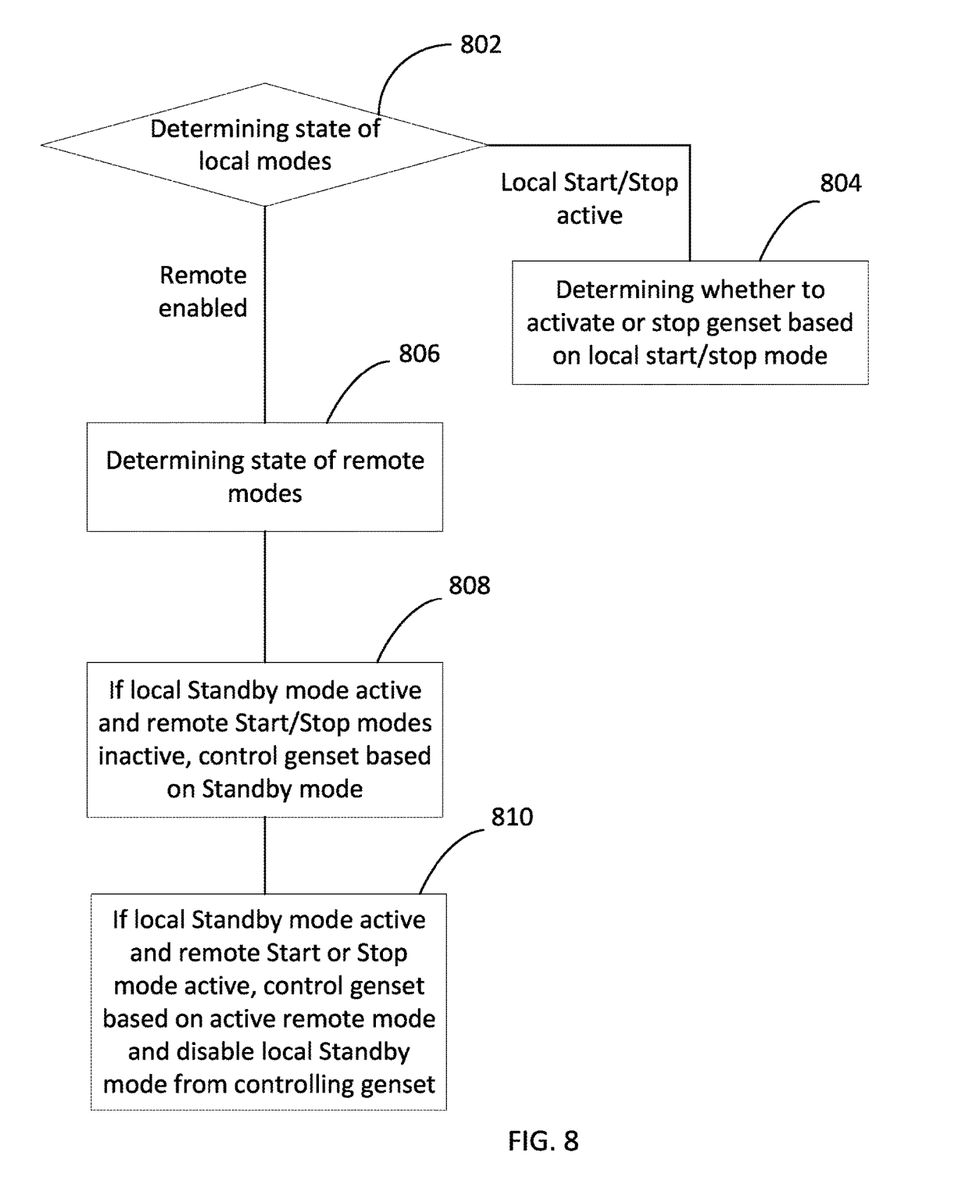
FIG. 8 is a flow chart for controlling the generator set of FIG. 1.

Referring now to FIG. 8, a flow chart for controlling the generator set of FIG. 1 is shown according to an exemplary embodiment. The flow chart may be implemented on the genset 100 and components shown in FIG. 1.

At an operation 802, the controller 110 determines a state of the local modes selected via the local interface 150. As shown in FIG. 2, a user can select from the local "Start," "Stop," "Standby Enabled," and "Remote Enabled" modes by, for example, pressing a corresponding button or corresponding buttons on the local interface. For example, to select the "Start" mode, the user can press the button 202; to select the "Stop" mode, the user can press the button 204; to select the "Standby Enabled" mode, the user can press the buttons 206 and 208; to select the "Remote Enabled" mode, the user can press the button 208 but not the button 206. In some embodiments, the "Standby Enabled" mode can only be activated if the "Remote Enabled" mode is also activated. In some such implementations, selection of the "Standby Enabled" mode may be disabled until the "Remote Enabled" mode is activated, or selection of the "Standby Enabled" mode may automatically activate the "Remote Enabled" mode as well.

If either of the local "Start" or "Stop" modes is selected, then at an operation 804, the controller 110 determines whether to activate or stop the genset 100 based on the local mode. If the current local mode is "Start," then the controller 110 starts the genset 110. If the current local mode is "Stop," then the controller 110 stops the genset 110.

If the local "Remote Enabled" mode is selected, then at an operation 806, the controller 110 determines a state of remote modes selected via the remote interface 182. As shown in FIG. 3, a user can select one from the remote "Start," "Stop," and "Standby Enabled" modes by, for example, pressing a corresponding button on the remote interface. For example, to select the "Start" mode, the user can press the button 302; to select the "Stop" mode, the user can press the button 304; to select the "Standby Enabled" mode, the user can press the button 306.

At an operation 808, in response to determining the local "Standby Enabled" mode is active and the remote "Start" and "Stop" modes are inactive, the controller 110 determines whether to activate or stop the genset 100 based on the "Standby Enabled" mode operation. For example, if no remote mode is active, or if a command is received from the remote device 180 to operate in "Standby Enabled" mode, the controller 110 operates according to standby operation and determines whether to activate or stop the genset 110 in response to one or more conditions being detected. At an operation 810, in response to determining the remote Start or Stop modes are active, the controller 110 determines whether to activate or stop the genset 100 according to the active remote mode, regardless of whether the local "Standby Enabled" mode is active. The controller 110 disables the local "Standby Enabled" mode from controlling activation and stopping of the genset 100 and makes the determination based on the active remote mode. This allows a user to remotely stop operation of the genset 100 even if the standby operation would cause the genset 100 to start (e.g., to conserve cost). Similarly, this may allow the user to remotely start the genset 100 even if the standby operation would not cause the genset 100 to start.

If the "Standby Enabled" mode is determined to control operation, the controller 110 activates or stops the genset 110 in response to one or more conditions being detected. The detected conditions may include a fuel level monitored by the fuel level sensor 122, a battery condition monitored by the battery monitor 142, a power outage monitored by an automatic transfer switch (ATS) 165, and remote conditions monitored by intelligent devices 170. The remote conditions may include a demand input from a load 190, a level of grid use monitored by a smart switch 175, etc.

In some embodiments, the controller 110 may stop the genset 100 in response to receiving commands from the fuel level sensor 122 indicating that the level of the remaining fuel is below a predetermined fuel level. In some embodiments, the controller 110 may stop the genset 100 in response to receiving commands from the battery monitor 142 indicating that the battery condition is below a predetermined battery condition level. In some embodiments, the controller 110 may activate the genset 100 in response to receiving commands from the ATS 165 indicating a utility power outage, and stop the genset 100 in response to receiving commands from the ATS 165 indicating that the utility power is back. In some embodiments, the controller 110 may activate the genset 100 in response to receiving commands from the load 190 indicating a demand input. The load 190 may include appliances such as the sump pump 192, the air conditioner 194, the refrigerator 196, etc. In some embodiments, the controller 110 may activate or stop the genset 100 in response to a level of grid use monitored by the smart switch 175. For example, the controller 110 may activate the genset 100 in response to receiving commands from the smart switch 175 indicating that the grid use is higher than a predetermined level of grid use.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementation described above should not be understood that the described methods can generally be integrated in a single application or integrated across multiple applications.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method for controlling a generator set, comprising:
    determining a state of a plurality of local modes selectable via a local interface proximate to the generator set, wherein the local modes comprise a remote enabled mode in which the generator set is enabled locally to activate or stop in response to receiving one or more commands from a device remote from a location of the generator set, a local standby mode in which the generator set activates or stops in response to detecting one or more conditions, a local start mode in which the generator set is activated locally, and a local stop mode in which the generator set is stopped locally;
    in response to determining the remote enabled mode is active, determining a state of a plurality of remote modes using the one or more commands, wherein the plurality of remote modes are selectable via a user interface on the device remote from the location of the generator set, and wherein the remote modes comprise:
   a remote start mode in which the generator set is activated remotely;
   a remote stop mode in which the generator set is stopped remotely; and
   a remote standby mode in which the generator set is enabled remotely to activate or stop automatically in response to the one or more conditions being detected;
in response to determining the local standby mode is active, the remote enabled mode is active, and the remote start and remote stop modes are inactive, determining whether to activate or stop the generator set in response to detecting the one or more conditions in accordance with the local standby mode;
in response to determining the local standby mode is active, the remote enabled mode is active, and one of the remote start mode or remote stop mode is active, determining whether to activate or stop the generator set based on the active remote mode and disabling the local standby mode from controlling activation of the generator set; and
in response to selection of the remote enabled mode from the local interface, enabling selection of the remote modes on the user interface of the device remote from the location of the generator set;
in response to selection of the local start mode or the local stop mode from the local interface, disabling selection of the remote modes on the user interface of the device remote from the location of the generator set;
wherein the one or more conditions comprise a power outage, and wherein, in response to selection of the remote enabled mode from the local interface and the remote standby mode from the remote interface, the generator set activates automatically in response to the power outage being detected.

2. The method of claim 1, wherein the one or more conditions further comprise at least one remote condition monitored by a remote device communicably connected to the generator set.

3. The method of claim 1, wherein the one or more conditions further comprise a fuel level of the generator set, and wherein, in response to selection of the remote enabled mode from the local interface and the remote standby mode from the remote interface, the generator set stops automatically in response to detecting that the fuel level is below a predetermined fuel level.

4. The method of claim 1, wherein the one or more conditions further comprise a demand input generated from a load, and wherein, in response to selection of the remote enabled mode from the local interface and the remote standby mode from the remote interface, the generator set activates automatically in response to receiving the demand input.

5. The method of claim 4, wherein the load comprises at least one of a sump pump, an air conditioner, a refrigerator, or a freezer.

6. The method of claim 1, wherein the one or more conditions further comprise a grid use, and wherein, in response to selection of the remote enabled mode from the local interface and the remote standby mode from the remote interface, the generator set activates automatically in response to the grid use being detected above a predetermined grid use level.

7. The method of claim 1, wherein the one or more conditions further comprise a condition of a battery of the generator set, and wherein, in response to selection of the remote enabled mode from the local interface and the remote standby mode from the remote interface, the generator set starts automatically in response to detecting that the condition of the battery is below a predetermined battery condition.

8. A system for controlling a generator set, comprising:
circuitry configured to:
   determine a state of a plurality of local modes selectable via a local interface proximate to the generator set, wherein the local modes comprise a remote enabled mode in which the generator set is enabled locally to activate or stop in response to receiving one or more commands from a device remote from a location of the generator set configured for wireless communication, a local standby mode in which the generator set activates or stops in response to detecting one or more conditions, a local start mode in which the generator set is activated locally, and a local stop mode in which the generator set is stopped locally;
   in response to determining the remote enabled mode is active, determine a state of a plurality of remote modes using the one or more commands, wherein the plurality of remote modes are selectable via a user interface on the device remote from the location of the generator set, and wherein the remote modes comprise:
      a remote start mode in which the generator set is activated remotely;
      a remote stop mode in which the generator set is stopped remotely; and
      a remote standby mode in which the generator set is enabled remotely to activate or stop automatically in response to the one or more conditions being detected;
   in response to determining the local standby mode is active, the remote enabled mode is active, and the remote start and remote stop modes are inactive, determine whether to activate or stop the generator set in response to detecting the one or more conditions in accordance with the local standby mode;
   in response to determining local standby mode is active, the remote enabled mode is active, and one of the remote start mode or remote stop mode is active, determine whether to activate or stop the generator set based on the active remote mode and disable the local standby mode from controlling activation of the generator set; and
   in response to selection of the remote enabled mode from the local interface, enabling selection of the remote modes on the user interface of the device remote from the location of the generator set;
   in response to selection of the local start mode or the local stop mode from the local interface, disabling selection of the remote modes on the user interface of the device remote from the location of the generator set;
   wherein the one or more conditions comprise a power outage, and wherein, in response to selection of the remote enabled mode from the local interface and the remote standby mode from the remote interface, the generator set activates automatically in response to the power outage being detected.

9. The system of claim 8, wherein the one or more conditions further comprise at least one remote condition monitored by a remote device communicably connected to the generator set.

10. The system of claim 8, wherein the one or more conditions further comprise a fuel level of the generator set, and wherein, in response to selection of the remote enabled mode from the local interface and the remote standby mode from the remote interface, the generator set stops automatically in response to detecting that the fuel level is below a predetermined fuel level.

11. The system of claim 8, wherein the one or more conditions further comprise a grid use, and wherein, in response to selection of the remote enabled mode from the local interface and the remote standby mode from the remote interface, the generator set activates automatically in response to the grid use being detected above a predetermined grid use level.

12. A generator set comprising:
an engine;
a generator operatively connected to the engine;
a local interface;
a communication interface structured to receive commands from a device remote from the generator set,
a controller communicably connected with the engine, the generator, the local interface, and the communication interface, the controller configured to:
  determine a state of a plurality of local modes selectable via the local interface, wherein the local modes comprise:
    a local start mode in which the generator set is activated locally;
    a local stop mode in which the generator set is stopped locally;
    a local standby mode in which the generator set is enabled locally to activate or stop automatically in response to one or more conditions being detected; and
    a remote enabled mode in which the generator set is enabled locally to activate or stop in response to receiving one or more commands from a device remote from a location of the generator set;
  in response to determining the remote enabled mode is active, determine a state of a plurality of remote modes using the one or more commands, wherein the plurality of remote modes are selectable via a user interface on the device remote from the location of the generator set, and wherein the remote modes comprise:
    a remote start mode in which the generator set is activated remotely;
    a remote stop mode in which the generator set is stopped remotely; and
    a remote standby mode in which the generator set is enabled remotely to activate or stop automatically in response to the one or more conditions being detected;
  in response to determining the local standby mode is active, the remote enabled mode is active, and the remote start and remote stop modes are inactive, determine whether to activate or stop the generator set in response to detecting the one or more conditions in accordance with the local standby mode;
  in response to determining local standby mode is active, the remote enabled mode is active, and one of the remote start mode or remote stop mode is active, determine whether to activate or stop the generator set based on the active remote mode and disable the local standby mode from controlling activation of the generator set; and
  in response to selection of the remote enabled mode from the local interface, enabling selection of the remote modes on the user interface of the device remote from the location of the generator set;
  in response to selection of the local start mode or the local stop mode from the local interface, disabling selection of the remote modes on the user interface of the device remote from the location of the generator set;
  wherein the one or more conditions comprise a power outage, and wherein, in response to selection of the remote enabled mode from the local interface and the remote standby mode from the remote interface, the generator set activates automatically in response to the power outage being detected.

13. The generator set of claim 12, wherein the one or more conditions further comprise at least one remote condition monitored by a remote device communicably connected to the generator set.

14. The generator set of claim 12, wherein the one or more conditions further comprise a fuel level of the generator set, and wherein, in response to selection of the local standby mode from the local interface or the remote enabled mode from the local interface and the remote standby mode from the remote interface, the generator set stops automatically in response to detecting that the fuel level is below a predetermined fuel level.

15. The generator set of claim 12, wherein the one or more conditions further comprise a grid use, and wherein, in response to selection of the local automatic mode from the local interface or the remote enabled mode from the local interface and the remote standby mode from the remote interface, the generator set activates automatically in response to the grid use being detected above a predetermined grid use level.

* * * * *